UNITED STATES PATENT OFFICE.

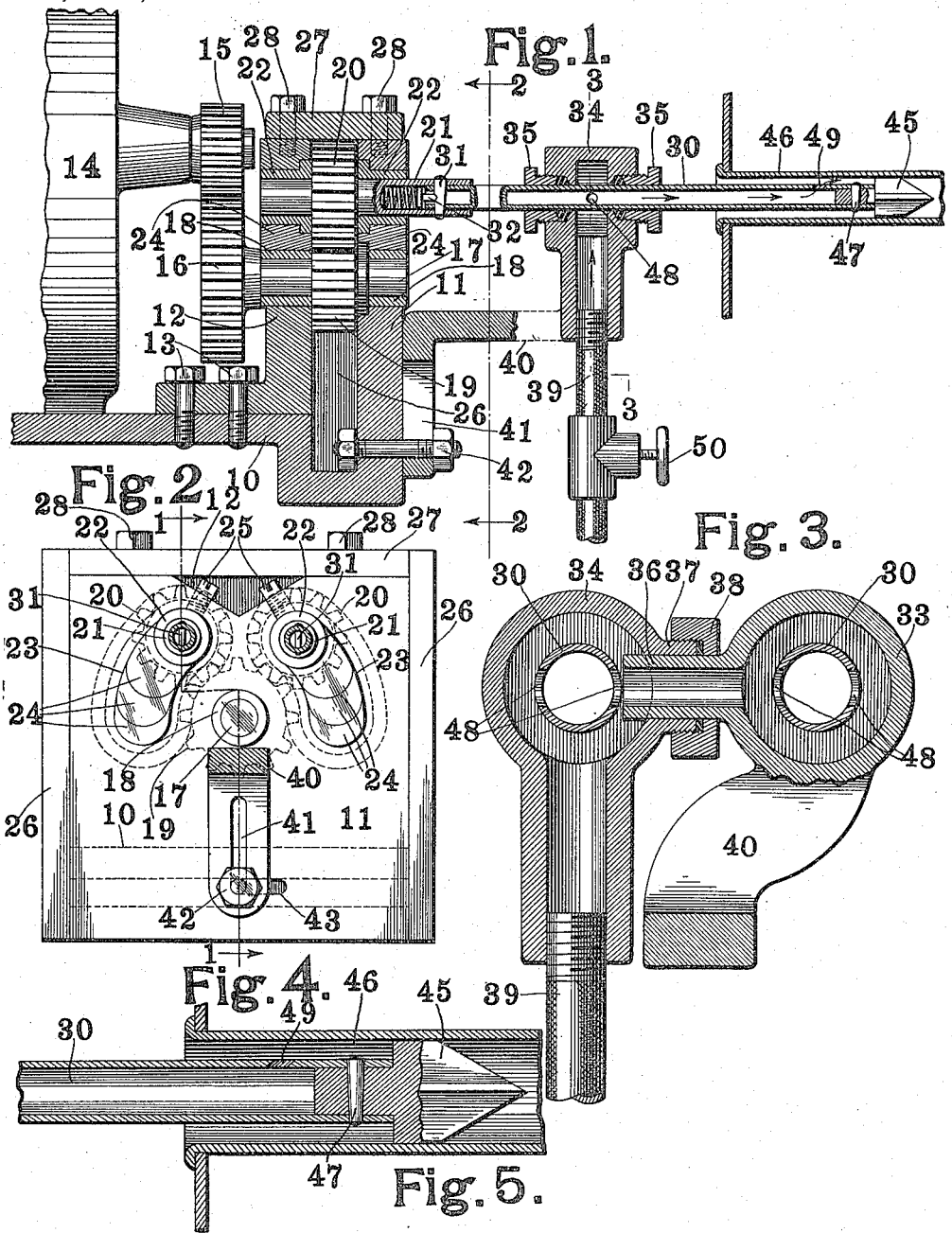

ALBERT F. FROUSSARD, OF ST. LOUIS, MISSOURI.

TUBE-CLEANER.

1,161,122.     Specification of Letters Patent.     Patented Nov. 23, 1915.

Application filed December 11, 1914. Serial No. 876,730.

*To all whom it may concern:*

Be it known that I, ALBERT F. FROUSSARD, a citizen of the United States of America, residing at the city of St. Louis, State of Missouri, have invented a certain new and useful Tube-Cleaner, of which the following is such a full, clear, and exact description as will enable any one skilled in the art to which it appertains to make and use the same, reference being had to the accompanying drawings, forming part of this specification.

My invention relates to tube cleaners and, more particularly, to a cleaner adapted to clean simultaneously a plurality of condenser tubes or water tubes for boilers.

One of the objects of my invention is to provide a cleaner of the class indicated which will be simple in construction and efficient in operation.

A further object of my invention is to provide means for adjusting the cleaner rods so that a single cleaner may be adapted to clean tubes having their centers different distances apart.

In the accompanying drawings, which illustrate one form of tube cleaner made in accordance with my invention, Figure 1 is a section taken on the line 1—1 of Fig. 2; Fig. 2 is a section taken on the line 2—2 of Fig. 1; Fig. 3 is an enlarged section taken on the line 3—3 of Fig. 1; Fig. 4 is an enlarged view showing the manner of discharging water from the cleaner rods into the tubes to be cleaned, and Fig. 5 is a detail perspective view of one of the filling pieces for adjusting the cleaner rods.

Like marks of reference refer to similar parts in the several views of the drawings.

10 is a base plate which has an upwardly extending part 11 forming one side of a housing. The opposite side of the housing is formed by a part 12 secured to the base plate 10 by means of bolts 13. Carried on the base plate 10 is a motor 14 provided with a gear wheel 15 meshing with a gear wheel 16 mounted on the end of a short driving shaft 17. This driving shaft 17 is journaled in the plates 11 and 12 and is preferably provided with bearings 18. Mounted upon the driving shaft 17 between the plates 11 and 12 is a gear wheel 19. This gear wheel 19 meshes with gear wheels 20 which are mounted upon short shafts 21 forming the ends of the tool shafts. These shafts 21 are preferably mounted in bearings 22. The bearings 22 are arranged in slots 23 which are concentric with the axis of the driving shaft 17 in order to allow adjustment of the rods to accommodate the machine to tubes having their centers different distances apart. Placed in the slots 23 are filling pieces 24 of the form best shown in Fig. 5. By shifting these pieces from one end to the other of the slots 23, it will be evident that the bearings, and consequently the tool shafts, will be thrown farther apart or nearer together so as to accommodate the machine to differently spaced tubes and, at the same time, the wheels 20 will remain in mesh with the wheel 19. Set screws 25 are used to hold the bearings and filling pieces firmly in position. The filling pieces 24 also serve to completely fill the slots 23 and, by the use of end pieces 26, the housing supporting the driving shaft and the ends of the tool rods is formed into a grease box which may be filled with grease to lubricate the wheels 19 and 20. A top piece 27 is also preferably used to strengthen the housing. This piece 27 is secured in position by bolts 28. The body 30 of each of the tool rods is formed of a hollow bar and is secured in the ends of the short shaft 21 by means of transverse pins 31 and spring detents 32. The rods 30 pass through a water box formed of two castings 33 and 34. Stuffing boxes 35 are provided to form a water tight joint between the castings and the rods 30. The casting 33 has formed on it a hollow projecting portion 36, shown in Fig. 3, which projection passes through a boss 37 so as to connect the two castings 33 and 34. A stuffing box 38 forms a water tight joint between the projection 36 and the boss 37. The water is led into the casing 34 by means of a flexible tube 39. The casting 33 is provided with an L-shaped arm 40, the downwardly extending projecting portion of which is provided with a slot 41 through which passes a bolt 42. This bolt 42 also passes through a lateral slot 43 in the plate 11. By loosening this bolt, the arm 40 can be adjusted both vertically and horizontally to correspond with the adjustment of one of the tool rods 30. The sliding connection between the projection 36 and the boss 37 allows the two castings 33 and 34 to be separated to correspond with the separation of the rods 30 when the adjustment is made. A tool 45 of any suitable construction, adapted to enter the tube 46, is secured to the outer end of the rod 30 by means of a pin 47. The water in the castings 33 and 34 enters the rods 30 by means of openings 48 and is discharged adjacent to the tool 45 through an inclined opening 49, best shown in Fig. 4. The water is thus projected forwardly into the tube at the point where it is most needed. The supply of water may be regulated by means of a valve 50 contained in the pipe 39.

The operation of my cleaner will be evident. The two cleaner rods 30 are adjusted a proper distance apart by shifting the filling pieces 24 from one end to the other of the slots 23. At the same time, the bolt 42 is loosened so as to allow the castings 33 and 34 to be correspondingly adjusted. After the adjustment is made, the bolt 42 as well as the set screws 25 are tightened to hold the parts firmly in position. Motion is imparted to the driving shaft 17 by the motor 14 so as to rotate the rods 30 and, therefore, the tool 45. At the same time, water is admitted through the tool rods 30 and discharged in a forward direction so as to be supplied to the tools 45.

It will be evident that my device is very simple in construction and extremely strong, and that it may be readily adapted to tubes of varying sizes.

Having fully described my invention, what I claim as new and desire to secure by Letters-Patent of the United States is:

1. In a tube cleaner, the combination with a driving shaft, of a gear wheel carried by said shaft, a plurality of cleaner rods, a gear wheel carried by each of said cleaner rods, and engaging with the periphery of said first named gear wheel, and means for adjusting the cleaner rods and their gear wheels relatively to the gear wheel on said driving shaft whereby the cleaner may be adapted to differently spaced tubes.

2. In a tube cleaner, the combination with a driving shaft, of a gear wheel carried by said shaft, a plurality of cleaner rods, a gear wheel carried by each of said cleaner rods and meshing with the gear wheel on said driving shaft, and means for adjusting the cleaner rods and their gear wheels relative to the gear wheel on said driving shaft in a path concentric with the axis thereof whereby the cleaner may be adapted to differently spaced tubes.

3. In a tube cleaner, the combination with a driving shaft, of a gear wheel carried by said shaft, a plurality of cleaner rods, a gear wheel on each of said cleaner rods and meshing with said first named gear wheel, a pair of plates in which said driving shaft and cleaner rods are journaled, said plates forming between them a wheel space, and means for closing the bottom and end of said wheel space.

4. In a tube cleaner, the combination with a driving shaft, of a gear wheel carried by said shaft, a plurality of cleaner rods, a gear wheel on each of said cleaner rods and meshing with said first named gear wheel, a housing provided with slots concentric with said driving shaft, and filling pieces in said slots for adjusting the bearings of said cleaner rods to adapt the same to differently spaced tubes.

5. In a tube cleaner, the combination with a frame, of a plurality of cleaner rods carried thereby, means for driving said rods, said rods being adjustable to adapt them to differently spaced tubes, a bracket adjustably carried on said frame, water boxes for said rods carried by said bracket, and means for adjusting said water boxes.

6. In a tube cleaner, the combination with a frame comprising an integral base and bearing plates, a second bearing plate secured to said base plate and forming with said first named bearing plate a gear box, cleaner rods carried in said bearing plates and having gear situated in said gear box, a driving shaft also journaled in said bearing plates, provided with a gear meshing of said first named gear, and means for closing the ends of said gear box.

In testimony whereof, I have hereunto set my hand and affixed my seal in the presence of the two subscribing witnesses.

ALBERT F. FROUSSARD. [L. S.]

Witnesses:
W. A. ALEXANDER,
G. M. SHORE.

Copies of this patent may be obtained for five cents each, by addressing the "Commissioner of Patents, Washington, D. C."